(12) United States Patent
Estes et al.

(10) Patent No.: US 8,116,631 B2
(45) Date of Patent: Feb. 14, 2012

(54) HARDENED, WAVELENGTH ENABLED OPTICAL CAPACITY

(75) Inventors: Daniel L. Estes, Lawrenceville, GA (US); Mark E. Pellegri, Roswell, GA (US)

(73) Assignee: Cox Communications, Inc., Atlanta, GA (US)

( * ) Notice: Subject to any disclaimer, the term of this patent is extended or adjusted under 35 U.S.C. 154(b) by 448 days.

(21) Appl. No.: 12/467,104

(22) Filed: May 15, 2009

(65) Prior Publication Data
US 2010/0034538 A1 Feb. 11, 2010

Related U.S. Application Data

(60) Provisional application No. 61/087,906, filed on Aug. 11, 2008.

(51) Int. Cl.
*H04J 14/02* (2006.01)

(52) U.S. Cl. .................. 398/83; 398/79; 398/85

(58) Field of Classification Search ............ 398/21, 398/79, 83, 85, 135, 138, 139
See application file for complete search history.

(56) References Cited

U.S. PATENT DOCUMENTS
6,944,404 B2 * 9/2005 Lange et al. ............ 398/138
* cited by examiner

*Primary Examiner* — Jack Dinh
(74) *Attorney, Agent, or Firm* — Merchant & Gould

(57) ABSTRACT

Providing bandwidth expansion in existing HFC infrastructures. A break in a fiber ring is established. A temperature hardened demultiplexer is coupled at the break to an input side of the fiber ring. A temperature hardened multiplexer is coupled at the break to an output side of the fiber ring. The temperature hardened demultiplexer is configured to pass-through a first predetermined wavelength to the temperature hardened multiplexer and to drop out a second predetermined wavelength. The second predetermined wavelength is extended from the demultiplexer for providing a first predetermined wavelength to an expansion node. The temperature hardened multiplexer is configured to receive the first predetermined wavelength from the temperature hardened demultiplexer and to receive the second predetermined wavelength from the expansion node.

20 Claims, 6 Drawing Sheets

HARDENED, WAVELENGTH ENABLED OPTICAL CAPACITY

RELATED APPLICATIONS

This application claims the benefit of U.S. Provisional Application No. 61/087,906, filed Aug. 11, 2008, entitled "HARDENED, WAVELENGTH ENABLED OPTICAL CAPACITY," which is hereby incorporated by reference in its entirety.

FIELD OF THE INVENTION

This disclosure relates in general to increasing bandwidth in a communications system, and more particularly to providing temperature hardened passive dense wave divisional multiplexing (DWDM) to allow economical fiber expansion in existing optical ring infrastructures.

BACKGROUND

Data networks contain various network devices, such as switches, routers, bridges, etc., for sending and receiving data between multiple locations. Many bandwidth-intensive data applications such as video conferencing, Video-on-Demand ("VoD"), and Subscription Video-on-Demand ("SVoD") require data link layer (i.e., Layer 2) networks capable of supporting Gigabit per second or higher data transfer rates. These high speed networks, which include Gigabit Ethernet ("GbE") or Asynchronous Transfer Mode ("ATM") networks, require a physical layer network such as a Synchronous Optical Network ("SONET") which is capable of transporting high speed data over large distances to one or more destinations. However, there has been tremendous growth in optical served business locations. Further, multiple protocols over fiber are often used. As a result, the optical infrastructure is experiencing fiber strand exhaust in existing sheaths, whereas efficient fiber sizing is desired in newly constructed sheaths.

SONET networks are typically deployed on a two-fiber protected architecture to provide redundancy in the event of a fault or fiber break. In a typical architecture, a primary ring transmits data in one direction (i.e., clockwise) while a backup ring transmits the data in the reverse direction. Thus, if the primary ring fails, the backup takes over. Traditional hybrid fiber coax (HFC) infrastructures are not capable of handling the large penetration of business services and small residential node sizes needed today. The construction costs of fiber relief and the time to build new fiber sheaths are deterrents to economical implementation for network needs. That is, the existing fiber in existing HFC infrastructures does not provide bandwidth to account for increases in demand on the network.

SUMMARY OF THE INVENTION

To overcome the limitations described above, and to overcome other limitations that will become apparent upon reading and understanding the present specification, embodiments for allowing economical fiber expansion in existing optical ring infrastructures are disclosed.

The above-described problems are solved by providing a system including a temperature hardened passive dense wave divisional multiplexing (DWDM) for expanding bandwidth in existing optical ring infrastructures, erbium doped fiber amplifiers, and electronically controlled variable optical attenuators.

An embodiment includes a method for providing bandwidth expansion in existing optical ring infrastructures. The method includes establishing a break in a fiber ring, coupling four temperature hardened demultiplexer at the break to an input side of the fiber ring, coupling a second temperature hardened multiplexer at the break to an output side of the fiber ring, configuring the temperature hardened demultiplexer to pass-through predetermined wavelengths at the temperature hardened multiplexer and to drop out other predetermined wavelengths, extending the first predetermined wavelengths from the demultiplexer for providing the first predetermined wavelength to an expansion node and configuring the temperature hardened multiplexer to receive the second predetermined wavelength from the temperature hardened demultiplexer and to receive the first predetermined wavelength from the expansion node.

In another embodiment of the present invention, a dense wave divisional multiplexing filter is provided. The dense wave divisional multiplexing filter includes a temperature hardened demultiplexer disposed at a break to an input side of a fiber ring, a temperature hardened multiplexer disposed at a break to an output side of a fiber ring and a subtending service, coupled to the temperature hardened demultiplexer and the temperature hardened multiplexer, for providing a first predetermined wavelength to an expansion node, wherein the temperature hardened demultiplexer is configured to forward a second predetermined wavelength to the temperature hardened multiplexer and to forward the first predetermined wavelength for provisioning to the subtending service, the temperature hardened multiplexer being configured to receive the second predetermined wavelength from the temperature hardened demultiplexer and to receive the first predetermined wavelength from the expansion node.

In another embodiment of the present invention, an optical ring communication infrastructure is provided. The optical ring communication infrastructure includes a primary ring for providing services to nodes within the primary ring using a first and a second wavelength, a protect ring for providing a redundant path for services to nodes within the protect ring using the first and second wavelength, a splice break disposed at a point in at least one of the primary ring and the protect ring and a dense wave divisional multiplexing filter inserted at a splice break, the dense wave divisional multiplexing filter including a temperature hardened demultiplexer disposed at a break to an input side of a fiber ring, a temperature hardened multiplexer disposed at a break to an output side of a fiber ring and a subtending service, coupled to the temperature hardened demultiplexer and the temperature hardened multiplexer, for providing the first predetermined wavelength to an expansion node, wherein the temperature hardened demultiplexer is configured to pass-through a second predetermined wavelength to the temperature hardened multiplexer and to pass the first predetermined wavelength for provision to the subtending service, the temperature hardened multiplexer being configured to receive the second predetermined wavelength from the temperature hardened demultiplexer and to receive the first predetermined wavelength from the expansion node.

These and various other advantages and features of novelty are pointed out with particularity in the claims annexed hereto and form a part hereof. However, for a better understanding of the disclosed embodiments, the advantages, and the objects obtained, reference should be made to the drawings which form a further part hereof, and to accompanying descriptive matter, in which there are illustrated and described specific examples of the disclosed embodiments.

BRIEF DESCRIPTION OF THE DRAWINGS

Referring now to the drawings in which like reference numbers represent corresponding parts throughout.

DETAILED DESCRIPTION

Figure 1:
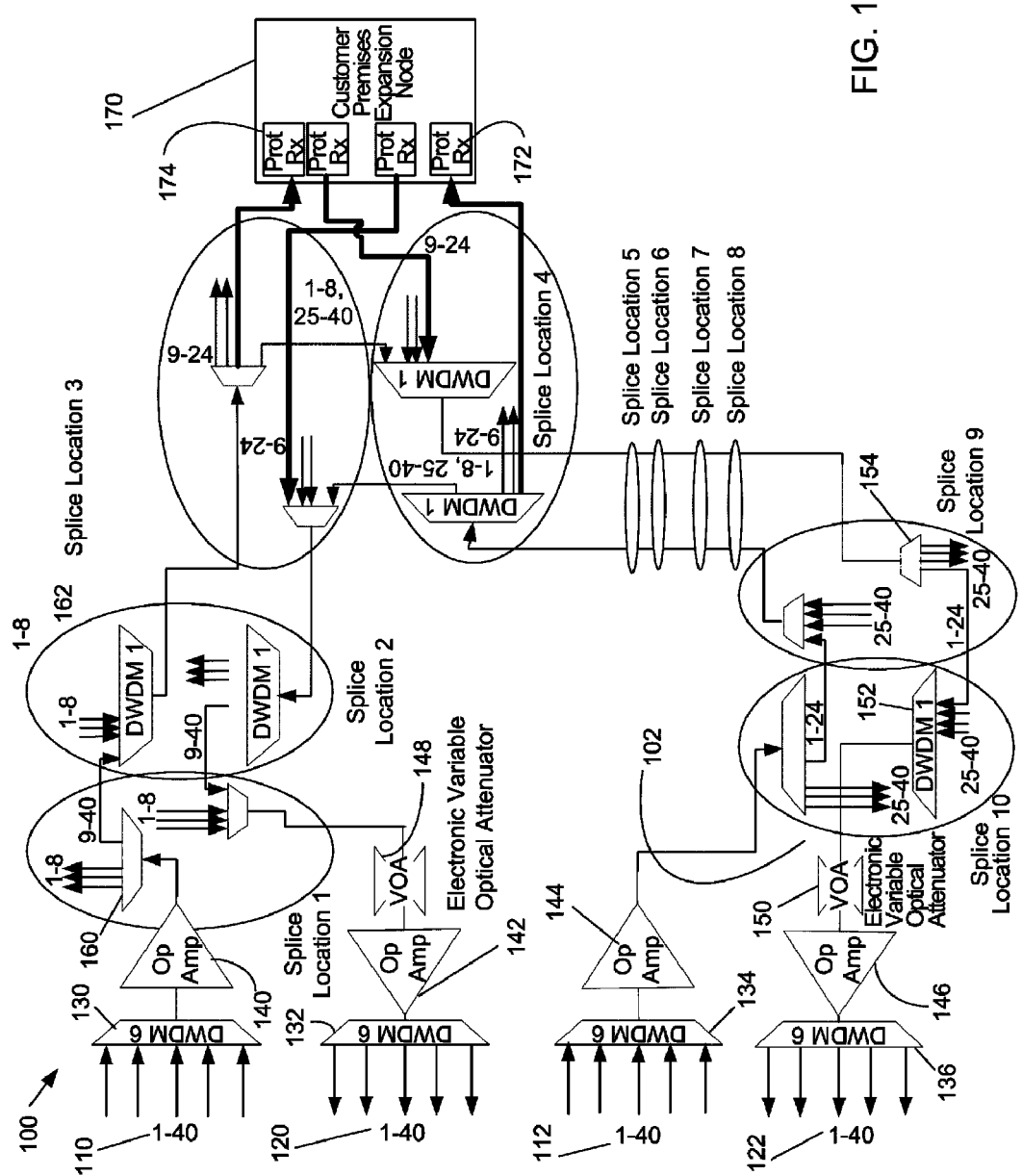
FIG. 1 is a simplified block diagram of a hybrid fiber coax infrastructure according to embodiments of the invention.

Embodiments of the present invention are directed to providing temperature hardened passive dense wave divisional multiplexing (DWDM) to allow economical fiber expansion in optical infrastructures. According to embodiments a system for providing temperature hardened passive dense wave divisional multiplexing (DWDM) to allow fiber expansion may include a hardened DWDM filter, a high output fiber amplifier, and an automatic electronic variable optical attenuator for sensing power. According to embodiments, design parameters of the system may include passive outside plant, multiple (e.g., 2) drop zones, multiple, (e.g., 6) pass through zones, variable (e.g., 4, 8, 16, or 32) wavelength drop capability, automatic power balancing at headend, protection switching done at electronics, temperature range −40° to +165° F., and 80 Km fiber.

According to embodiments, Dense Wave Divisional Multiplexing (DWDM) is a technology that puts data from different sources together on an optical fiber, with each signal carried at the same time on its own separate light wavelength. The wavelength of each channel is selected so that the channels do not interfere with each other and the transmission losses to the fiber are minimized. The wavelength of the emitting lasers must be locked to a particular wavelength with tight precision to prevent such interference. However, lasers tend to drift for a number of reasons, including variation in ambient temperature. A flat response places much less stringent requirements on the tolerance for the transmitted wavelength. Thus, a flat response is required for all the wavelengths across a broad temperature range.

Two-fiber strands are taken out of the optical ring configuration so as to set up a protective passive service. The two fibers that leave the headend currently pass through multiple splice points in the network. According to embodiments, two splice locations on the optical ring configuration receive a multiplexing and demultiplexing filter pair that is designed for a particular optical spectrum, for example, the entire C-band. According to one embodiment, a pair of multiplexing and demultiplexing filters with up to 40 wavelengths max then be deployed in a ring. A pre-designed set of wavelengths may then be dropped, for example, wavelengths 32 to 40, may be dropped out per port and a wavelength per fiber spliced to a subtending portion, which is typically newly constructed fiber cable that intercepts the main route of the main optical ring at the initial splice point, fans out through all the businesses or private customers that need to connect to the system, and then intercepts the main fiber route at a secondary splice point to allow a protected service set to those customers on that ring. In this embodiment there is no single point of failure by going to the two different splice points. For example, if the cable was on a pole and the splice case was accidentally destroyed, services (signaling) would switch over to a backup at the splice point down the street.

FIG. 1 illustrates a simplified block diagram 100 of an optical ring fiber infrastructure according to embodiments of the invention. In FIG. 1, the 1-40 input 110, 112 and output 120, 122 lines illustrated on the left side of the drawing represent signals of a customer at a standard DWDM non-hardened filter 130-136. All the components here would be in a headend or controlled environment location, thus the need for hardened filters does not exist. To the right of the customer non-hardened DWDM filters 130-136 are optical amplifiers 140-146 (Op Amps) and electronic variable optical attenuators (EVOA) 148, 150. According to another embodiment, the EVOAs 148, 150 may be deployed on the other side of the optical amplifiers 140-146. A break is established in the fiber infrastructure for implementing bandwidth expansion. In the lower center at ring 102, splice location 10 includes a multiplexer 152 at the output side of the break and splice location 9 includes a demultiplexer 154 at the input side of the break, which are hardened DWDM filters according to embodiments of the invention. According to an embodiment, the DWDM filter is configured with a pass-through port so that the multiplexer 152 may include a pass-through receiving port for wavelengths 1-24 and the demultiplexer 154 may include a pass through output port for wavelengths 1-24. A subtending ring extending from the DWDM filters for wavelengths 25-40 is illustrated and described below with respect to FIG. 2. According to an embodiment the DWDM filters 152, 154 are operative to allow pass-through wavelengths associated with wavelengths 1-24.

Referring to the DWDM filters 160, 162 illustrated at splice locations 1 and 2, for purposes of example, there are actually different pass-through wavelengths for wavelengths 1-8. That is, the hardened DWDM filters 160, 162 are configured to pass through some wavelengths. The configuration of dropped and passed-through wavelengths may be specific to the geography of the wavelength intended to be used at that particular zone. The customer premises 170 may thus includes a main transmit and receive fiber 172 for the protect side and then the main ring primary 174 includes the transmit and receive fiber for the primary path.

Referring still to FIG. 1, splice locations labeled locations 1 and 2 on the diagram are actually physically diverse. Wavelengths 1-8 are not dropped out of splice locations 1 and 2 are passed through to the subtending splice case down the street. So there is a drop capability and then a pass-through capability and then the losses associated with the optical performance of that network depend on which wavelengths and how many times you drop them and how many times you pass them through. An economical approach is to have some number of wavelengths that you do not drop out because the optical losses on the through side are less than the optical losses on the drop side.

According to this embodiment, up to 40 wavelengths may be provided in this network, and the same wavelengths may be dropped out at other locations, and then those wavelengths may be passed through and not be dropped. Depending on the physical distance of the main fiber ring, the subtending rings and the number of wavelengths dropped at each splice point, a network of optical rings can be designed.

In this embodiment, referring still to FIG. 1, amplification via optical amplifiers 140-146 is required at the launch point at the headend. Since amplifiers require power, they would be located only at the headend. The network outside the headend would be completely passive and would not require any electricity at all except at the customer premises.

According to an embodiment, electronic variable optical attenuators (EVOA) 148, 150 in FIG. 1 are used at the headend. With regard to a wavelength that is regenerated by a customer premises equipment, the losses that are going to be associated with that particular customer location may not be known ahead of time. But the ability to plug in a standard power optical transmitter with no manual adjustments must be provided. The variable optical attenuators 148, 150 at the headend sense that such wavelength has come online. The input to the associated amplifier 142, 146 needs to be flat so that the performance is stable over the entire spectrum. And, the EVOA device 148, 150 senses the wavelength coming in and flattens the output so that the gain for the amplifier is flat. According to one embodiment the EVOAs 148, 150 are deployed to the right of the optical amplifiers 140-146, illustrated in FIG. 1.

Figure 2:
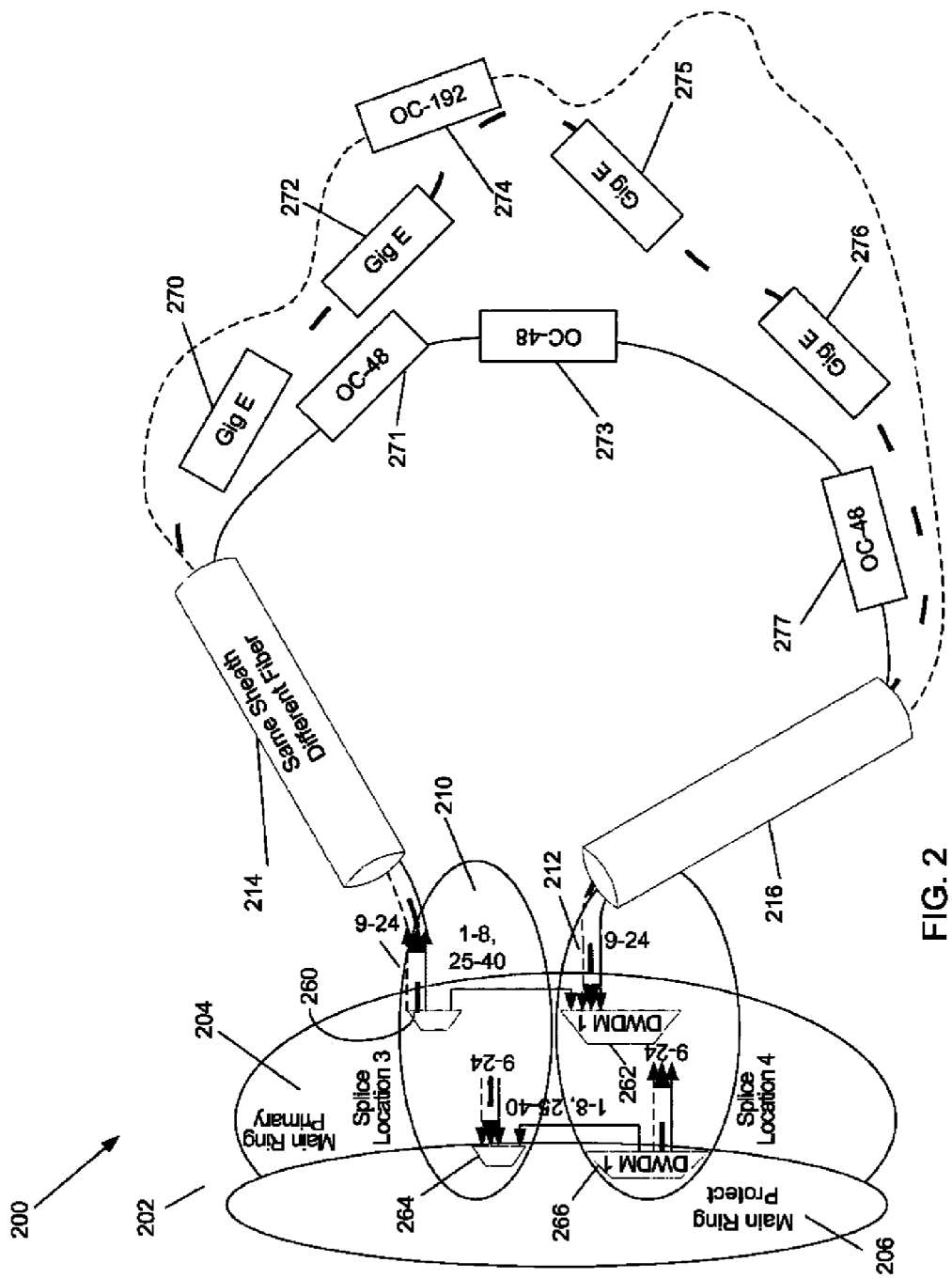
FIG. 2 is a simplified block diagram of a fiber distribution ring extending from a hardened DWDM filter according to embodiments of the invention.

FIG. 2 illustrates a simplified block diagram 200 of a fiber distribution ring extending from a hardened DWDM filter according to embodiments of the invention. In FIG. 2, a subtending range is illustrated that would be coming from the splice locations 1 and 2 illustrated in FIG. 1. Referring still to FIG. 2, the main ring 202 includes a primary path 204 and a "protect" path 206. Accordingly, a main and a back-up path are provided within the main fiber sheath. The two oval shapes 210, 212 are the hardened DWDMs including the demultiplexer 260 and multiplexer 262 (see also 160, 162 in FIG. 1). Sheaths 214, 216 are shown for the paths to and from the demultiplexer 260 and multiplexer 262, respectively. To the right of the sheaths 214, 216 are customer premises locations 270-277 that have protected ring services.

Referring to FIG. 2 in more detail, FIG. 2 illustrates a protected path 206 in the main ring 202 (main ring protect). That is, transmit and receive fiber are provided for the protect side 206 and then the main ring primary 204 includes the transmit and receive fiber for the primary path. These two rings then would be intercepted by the hardened DWDM filters 260-266 and then the output of the wavelengths would then be spliced to a fiber sheath 214—a single sheath—but it would be a wavelength per fiber that would be available on any one of the fiber strands leaving the splice locations.

On each of these wavelengths then, you could run different speed electronics. For example, on one wavelength, an OC-48 service may be provided on the ring with multiple nodes 271, 273, 274, 277 and then a separate wavelength would have, for example, a lower speed, lower cost electronics, indicated here by the GigE boxes 270, 272, 275, 276. For another example, you may have the need for one or two customers within a geography that would have a huge capacity that you might need an OC-192 on it. So, all of these different speed services are available on a per wavelength basis in this subtending ring 200. Depending on how many wavelengths that are dropped out of a hardened DWDM filter set, different optical line rates may be provided within a particular geographic zone.

Figure 3:
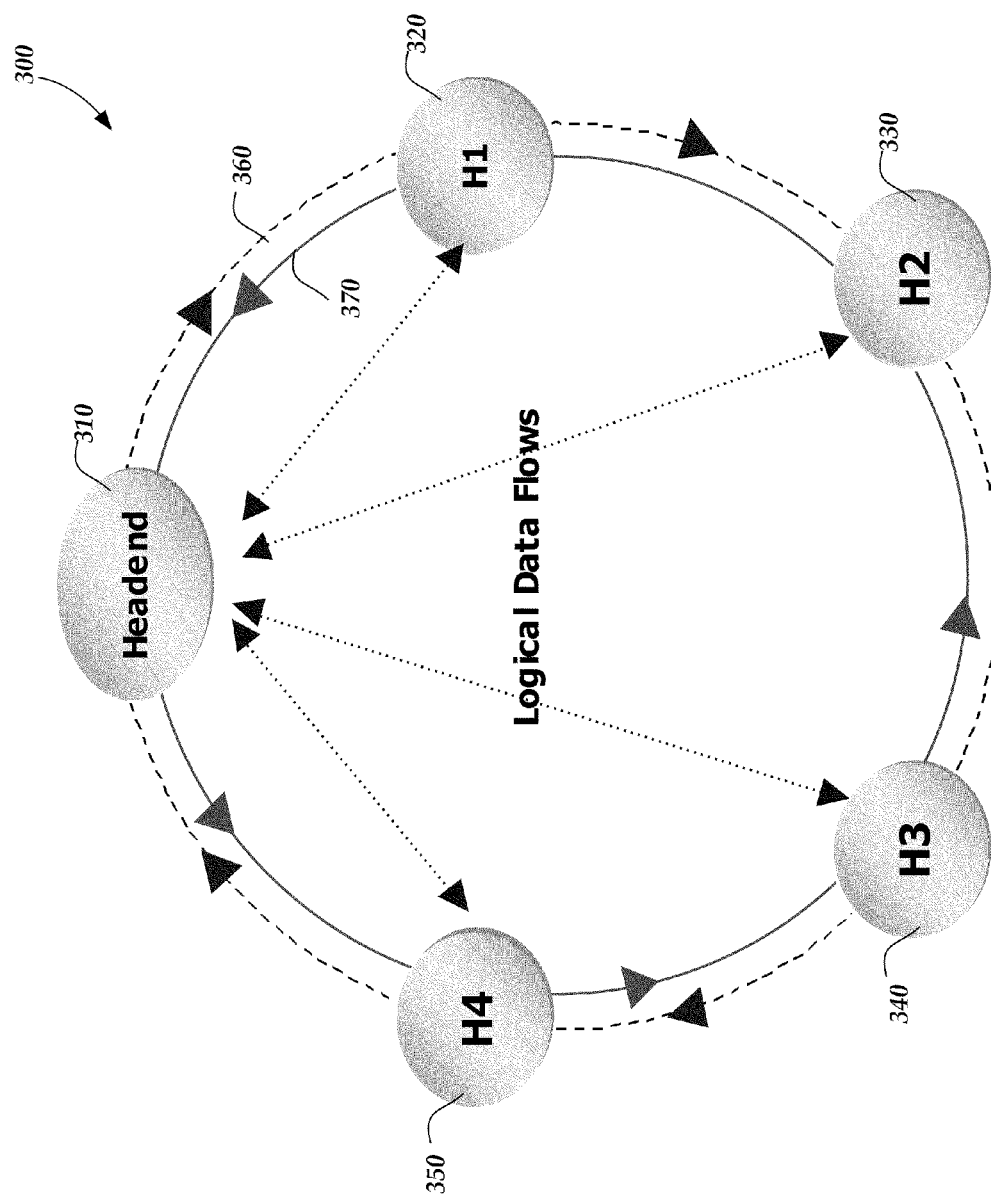
FIG. 3 is a diagram of a multipath data network according to one embodiment of the present invention.

FIG. 3 is a diagram of a multipath data network 300 according to one embodiment of the present invention. In FIG. 3, a multipath data network 300 has a protected optical ring architecture for communicating a data stream over a primary path 360 (indicated by a dashed ring flowing in the clockwise direction) and a secondary path 370 (indicated by a solid ring flowing in the counter-clockwise direction). It will be appreciated that the secondary path 370 may be utilized as a redundant or protect path should a fault occur over the primary path 360 in the multipath data network 300. In the multipath data network 300, the data stream is protected by simultaneous transmission of the data stream over both the primary path 360 and the secondary path 370 by a headend 310 and nodes H1 320, H2 330, H3 340, and H4 350. It should be understood that through this description, the headend 310 and nodes H1 320, H3 340, and H4 350 may alternatively be described as nodes 310, 320, 330, 340, and 350.

Those skilled in the art will appreciate that the multipath data network 300 may be physically implemented as a two fiber optical ring configuration, such as a Universal Path Switched Ring ("UPSR"), and that the nodes 310-350 include fiber-optic transmission systems configured for optical communication in a Synchronous Optical Network ("SONET") environment. As known to those skilled in the art, SONET is a standard for connecting fiber-optic transmission systems and allows data streams communicated at different rates to be multiplexed. SONET also enables a control channel to be embedded in a data flow for communicating various Section Level Control messages related to one or more states of the network.

During normal operation, each node in the multipath data network 300 receives a data stream from an adjacent upstream node over the primary path 360 and parses the data stream for data intended for that node. Data identified intended for a node is then "dropped" or removed from the data stream and distributed to one or more node clients. Similarly, data from one or more node clients intended for another node (such as the headend) is inserted in the data stream which then continues to be transmitted to an adjacent downstream node over the primary path 360 and the secondary path 370. Those skilled in the art will appreciate that this operation is known as "drop and continue (pass through)" deployment. It should be understood that although the data communication in the multipath network 300 is described as physically flowing from node to node, it will be appreciated that the data flows in the network are full duplex routes between the headend 310 and each node 320-350 as shown by the dotted arrows in FIG. 3.

Figure 4:
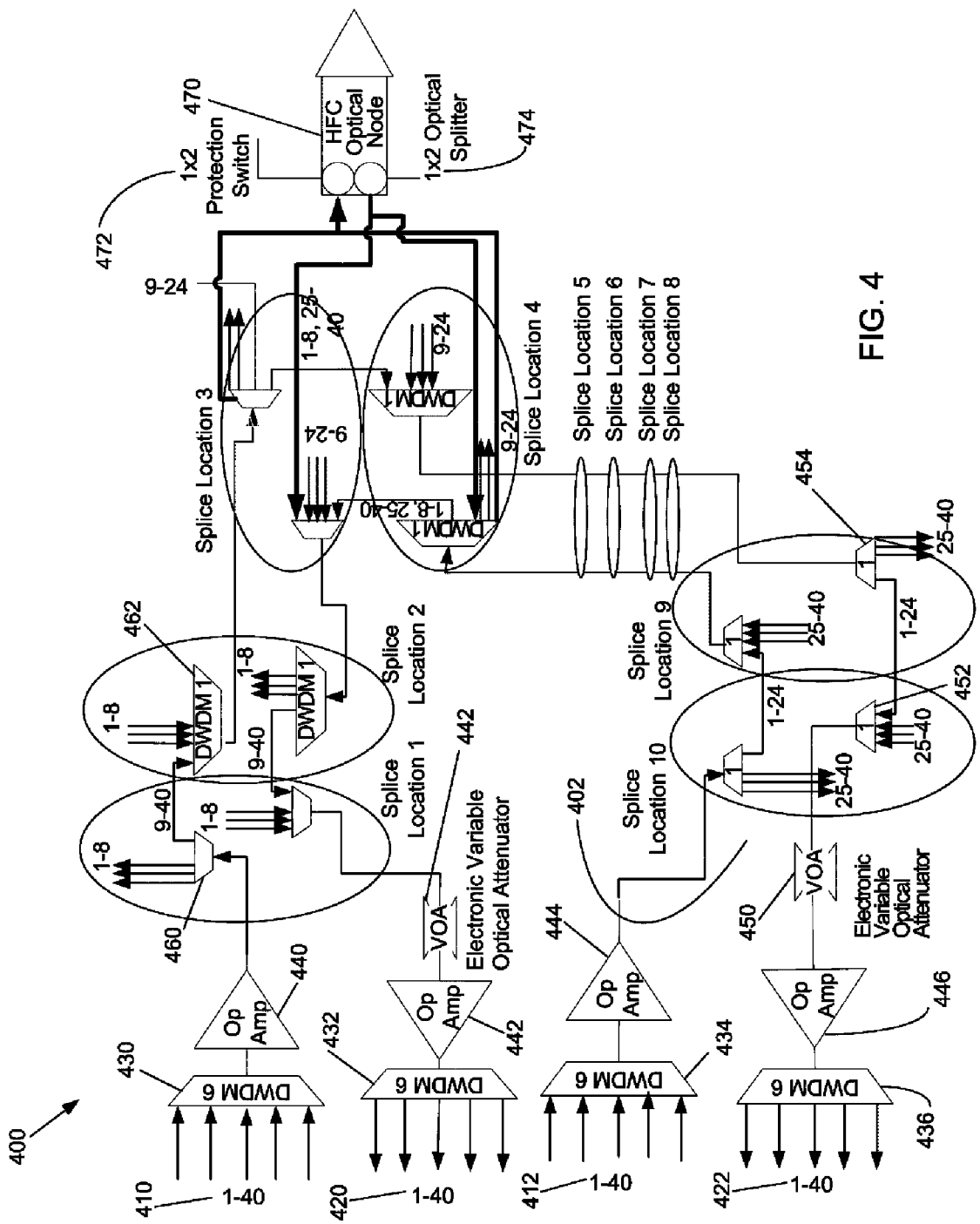
FIG. 4 illustrates a block diagram of a fiber expansion applied to a Hybrid Fiber Coax (HFC) optical node according to embodiments of the invention.

FIG. 4 illustrates a block diagram 400 of a fiber expansion applied to a Hybrid Fiber Coax (HFC) optical node according to embodiments of the invention. In FIG. 4, the 1-40 input 410, 412 and output 420, 422 lines illustrated on the left side of the drawing represent signals at a standard DWDM non-hardened filter 430-436. Optical amplifiers 440-446 (Op Amps) and electronic variable optical attenuators (EVOA) 448, 450. Again, a break is established in the fiber infrastructure for implementing bandwidth expansion.

In the lower center at ring 402, splice location 10 includes a multiplexer 452 at the output side of the break and splice location 9 includes a demultiplexer 454 at the input side of the break, which are hardened DWDM filters according to embodiments of the invention. According to an embodiment, the DWDM filter is configured with a pass-through port so that the multiplexer 452 may include a pass-through receiving port for wavelengths 1-24 and the demultiplexer 454 may include a pass through output port for wavelengths 1-24.

A subtending ring extending from the DWDM filters for wavelengths 25-40 is illustrated and described below with respect to FIG. 2. According to an embodiment the DWDM filters 452, 454 are operative to allow pass-through wavelengths associated with wavelengths 1-24. Again, DWDM filters 460, 462 at splice locations 1 and 2, provide pass-through wavelengths for wavelengths 1-8.

In FIG. 4, the HFC optical node 470 includes a 1×2 protection switch 472 and a 1×2 optical splitter 474. Thus, an embodiment of this system may also be used to provide protected wavelengths for optical nodes 470 associated with Hybrid Fiber Coax (HFC) systems. In this embodiment, the forward path analog modulated optical signals are modulated using wavelength specific lasers which pass through a dense wavelength division filter 410, 412 at the headend. In the field, the hardened demultiplexer filter drops the wavelengths in a particular geographic area where they are received by HFC optical nodes 470.

The protect forward path signal would be sent in the opposite side of an optical ring to the secondary demultiplexing filter, where the signal would be available to a protection switch at the HFC optical node 470. The reverse path signal would be modulated by a wavelength specific return path laser. The return path signal would then pass through an optical splitter 474, providing a path for the primary and protect wavelengths to reach the hardened multiplexer at the primary and secondary splice points.

Figure 5:
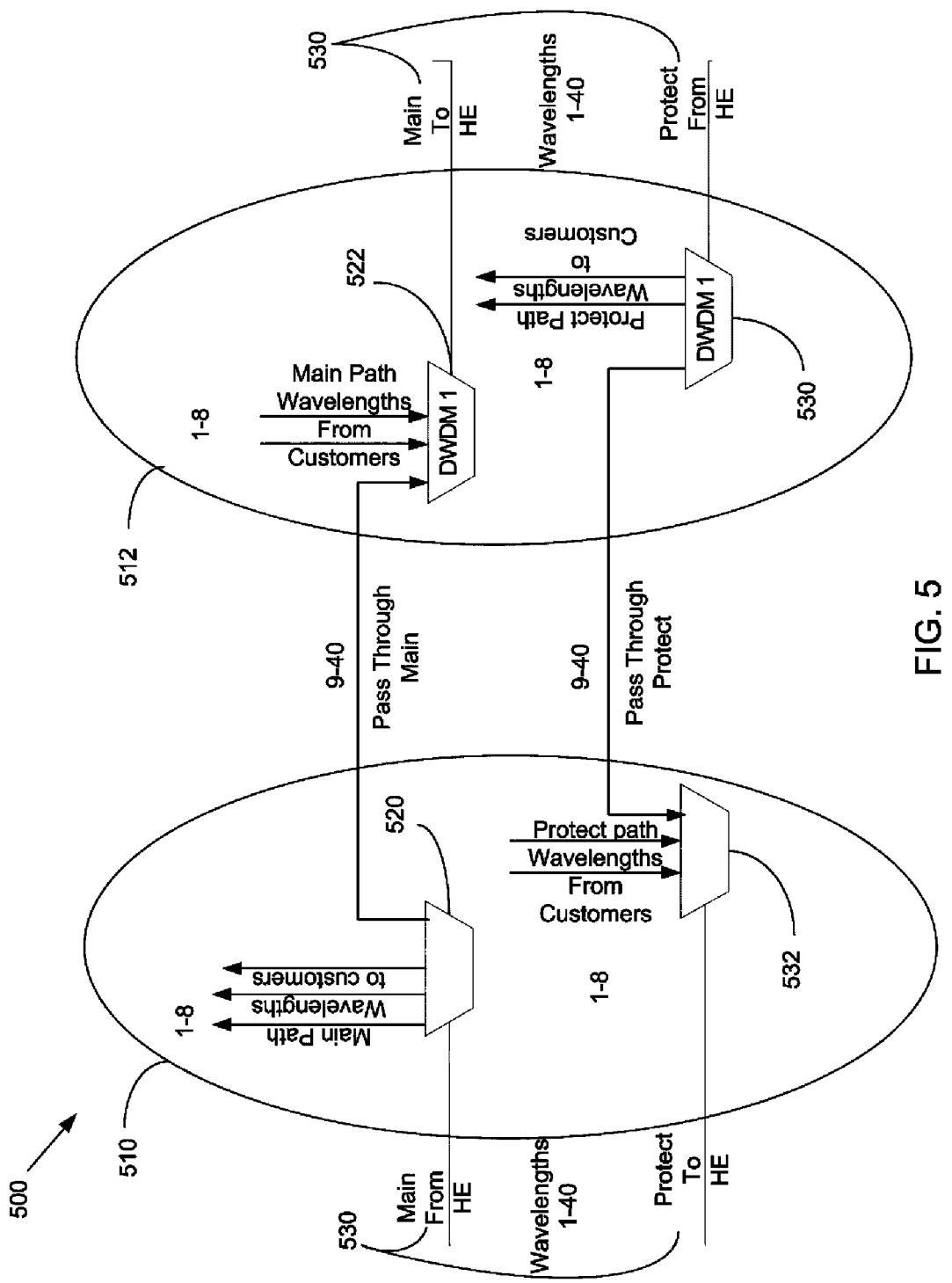
FIG. 5 is a block diagram showing multiple splice locations according to an embodiment of the invention.

FIG. 5 is a block diagram showing multiple splice locations 500 according to an embodiment of the invention. In FIG. 5, a first splice location 510 includes a demultiplexer 520 at the input side of the break and splice location 512 includes a multiplexer 522 at the output side of the break. The demultiplexer 520 provides main path wavelengths to customers and pass through main signals to multiplexer 522. The multiplexer 522 receives the main path wavelengths from the customer and provides a connection back to the headend 530.

Similarly, the second splice location 512 includes a demultiplexer 530 and the first splice location 512 includes a multiplexer 522. The demultiplexer provides protected path wavelengths to customers and pass through protect signals to multiplexer 532. The multiplexer 522 receives the protect path wavelengths from the customer and provides a connection back to the headend 530.

Figure 6:
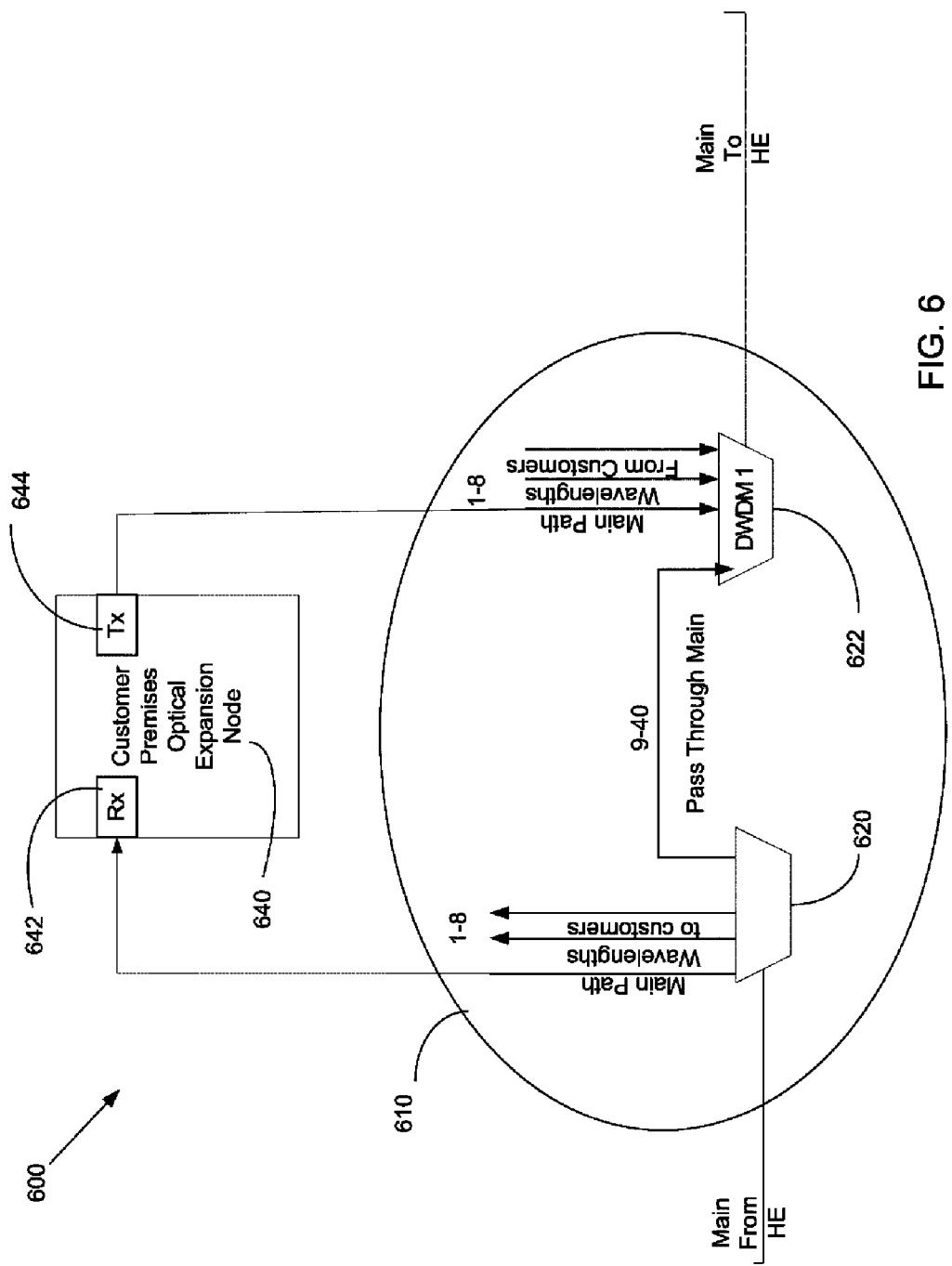
FIG. 6 is a block diagram showing a single splice location according to an embodiment of the invention.

FIG. 6 is a block diagram showing a single splice location 600 according to an embodiment of the invention. In FIG. 6, a splice location 610 includes a demultiplexer 620 at the input side of the break. A multiplexer 522 is disposed at the output side of the break. The demultiplexer 620 provides main path wavelengths to customers and pass through main signals to multiplexer 622. The multiplexer 622 receives the main path wavelengths from the customer and provides a connection back to the headend. In FIG. 6, the customer premises 640 having an optical expansion node is shown. The customer premises 640 includes a receive port 642 that is coupled to the demultiplexer 620 and a transmit port that is coupled to the multiplexer 622.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method for providing bandwidth expansion in optical fiber ring infrastructures, comprising:
    establishing a break in a fiber ring;
    coupling a temperature hardened demultiplexer at the break to an input side of the fiber ring;
    coupling a temperature hardened multiplexer at the break to an output side of the fiber ring;
    configuring the temperature hardened demultiplexer to pass-through a first predetermined wavelength at the temperature hardened multiplexer and to drop out a second predetermined wavelength;
    extending the first predetermined wavelength from the demultiplexer for providing the first predetermined wavelength to an expansion node; and
    configuring the temperature hardened multiplexer to receive the second predetermined wavelength from the temperature hardened demultiplexer and to receive the first predetermined wavelength from the expansion node.

2. The method of claim 1 further comprising providing the first and second predetermined wavelengths received by the multiplexer to the output side of the fiber ring.

3. The method of claim 1, wherein the extending the first predetermined wavelength from the demultiplexer further comprises splicing the output of the demultiplexer providing the first predetermined wavelength to a fiber sheath providing a path to the expansion node.

4. The method of claim 1 further comprising inserting an optical amplifier between a headend of the ring and the break.

5. The method of claim 4 further comprising inserting an electronic variable optical attenuators between a headend of the ring and the break.

6. The method of claim 5, wherein the inserting the electronic variable optical attenuators between a headend of the ring and the break comprises inserting the electronic variable optical attenuators between a headend of the ring and the optical amplifier.

7. The method of claim 5, wherein the inserting the electronic variable optical attenuators between a headend of the ring and the break comprises inserting the electronic variable optical attenuators between the optical amplifier and the break.

8. A dense wave divisional multiplexing filter, comprising:
    a temperature hardened demultiplexer disposed at a break to an input side of a fiber ring;
    a temperature hardened multiplexer disposed at a break to an output side of a fiber ring; and
    a subtending service, coupled to the temperature hardened demultiplexer and the temperature hardened multiplexer, for providing a first predetermined wavelength to an expansion node
    wherein the temperature hardened demultiplexer is configured to forward a second predetermined wavelength to the temperature hardened multiplexer and to forward the first predetermined wavelength for provisioning to the subtending service, the temperature hardened multiplexer being configured to receive the second predetermined wavelength from the temperature hardened demultiplexer and to receive the first predetermined wavelength from the expansion node.

9. The dense wave divisional multiplexing filter of claim 8, wherein the multiplexer is configured to provide the first and second predetermined wavelengths received by the multiplexer to the output side of the fiber ring.

10. The dense wave divisional multiplexing filter of claim 8, wherein the temperature hardened demultiplexer further comprises an output splicing the first predetermined wavelength to a fiber sheath for providing a path to the expansion node.

11. The dense wave divisional multiplexing filter of claim 8 further comprising an optical amplifier inserted between a headend of the ring and the break.

12. The dense wave divisional multiplexing filter of claim 11 further comprising an electronic variable optical attenuators inserted between a headend of the ring and the break.

13. The dense wave divisional multiplexing filter of claim 12, wherein the electronic variable optical attenuator is inserted between a headend of the ring and the optical amplifier.

14. The dense wave divisional multiplexing filter of claim 12, wherein the electronic variable optical attenuator is inserted between the optical amplifier and the break.

15. An optical ring hybrid fiber coax communication infrastructure, comprising:
   a primary ring for providing services to nodes within the primary ring using a first and a second wavelength;
   a protect ring for providing a redundant path for services to nodes within the protect ring using the first and second wavelength;
   a splice break disposed at a point in at least one of the primary ring and the protect ring; and
   a dense wave divisional multiplexing filter inserted at a splice break, the dense wave divisional multiplexing filter comprising:
      a temperature hardened demultiplexer disposed at a break to an input side of a fiber ring;
      a temperature hardened multiplexer disposed at a break to an output side of a fiber ring; and
      a subtending service, coupled to the temperature hardened demultiplexer and the temperature hardened multiplexer, for providing the first predetermined wavelength to an expansion node;
      wherein the temperature hardened demultiplexer is configured to pass-through a second predetermined wavelength to the temperature hardened multiplexer and to pass the first predetermined wavelength for provision to the subtending service, the temperature hardened multiplexer being configured to receive the second predetermined wavelength from the temperature hardened demultiplexer and to receive the first predetermined wavelength from the expansion node.

16. The optical ring hybrid fiber coax communication infrastructure of claim 15, wherein the multiplexer is configured to provide the first and second predetermined wavelengths received by the multiplexer to the output side of the fiber ring.

17. The optical ring hybrid fiber coax communication infrastructure of claim 15, wherein the temperature hardened demultiplexer further comprises an output splicing the first predetermined wavelength to a fiber sheath for providing a path to the expansion node.

18. The optical ring hybrid fiber coax communication infrastructure of claim 15 further comprising an optical amplifier inserted between a headend of the ring and the break.

19. The optical ring hybrid fiber coax communication infrastructure of claim 18 further comprising an electronic variable optical attenuators inserted between a headend of the ring and the break.

20. The optical ring hybrid fiber coax communication infrastructure of claim 19, wherein the electronic variable optical attenuator is inserted at the optical amplifier.

* * * * *

UNITED STATES PATENT AND TRADEMARK OFFICE
CERTIFICATE OF CORRECTION

PATENT NO. : 8,116,631 B2  Page 1 of 1
APPLICATION NO. : 12/467104
DATED : February 14, 2012
INVENTOR(S) : Estes et al.

It is certified that error appears in the above-identified patent and that said Letters Patent is hereby corrected as shown below:

Col. 8, line 21, claim 5: "optical attenuators between" should read --optical attenuator between--

Col. 8, line 24, claim 6: "optical attenuators between" should read --optical attenuator between--

Col. 8, line 26, claim 6: "optical attenuators between" should read --optical attenuator between--

Col. 8, line 29, claim 7: "optical attenuators between" should read --optical attenuator between--

Col. 8, line 31, claim 7: "optical attenuators between" should read --optical attenuator between--

Col. 8, lines 66-67, claim 12: "optical attenuators inserted" should read --optical attenuator inserted--

Col. 10, line 24, claim 19: "optical attenuators inserted" should read --optical attenuator inserted--

Signed and Sealed this
Thirteenth Day of November, 2012

David J. Kappos
*Director of the United States Patent and Trademark Office*